US012126916B2

(12) United States Patent
Youngquist et al.

(10) Patent No.: US 12,126,916 B2
(45) Date of Patent: Oct. 22, 2024

(54) CAMERA ARRAY FOR A MEDIATED-REALITY SYSTEM

(71) Applicant: Proprio, Inc., Seattle, WA (US)

(72) Inventors: James Andrew Youngquist, Seattle, WA (US); David Julio Colmenares, Seattle, WA (US); Adam Gabriel Jones, Seattle, WA (US)

(73) Assignee: Proprio, Inc., Seattle, WA (US)

( * ) Notice: Subject to any disclaimer, the term of this patent is extended or adjusted under 35 U.S.C. 154(b) by 305 days.

(21) Appl. No.: 17/461,588

(22) Filed: Aug. 30, 2021

(65) Prior Publication Data

US 2021/0392275 A1 Dec. 16, 2021

Related U.S. Application Data

(63) Continuation of application No. 16/808,194, filed on Mar. 3, 2020, now Pat. No. 11,303,823, which is a
(Continued)

(51) Int. Cl.
*H04N 23/90* (2023.01)
*G02B 3/00* (2006.01)
*G06T 7/50* (2017.01)
*G06T 7/521* (2017.01)
*G06T 7/557* (2017.01)
*G06T 19/00* (2011.01)
(Continued)

(52) U.S. Cl.
CPC ........... *H04N 23/90* (2023.01); *G02B 3/0056* (2013.01); *G06T 7/50* (2017.01); *G06T 7/521* (2017.01); *G06T 7/557* (2017.01); *G06T 19/006* (2013.01); *H04N 13/243* (2018.05); *H04N 23/45* (2023.01); *H04N 23/51* (2023.01); *G06T 2207/10028* (2013.01); *G06T 2207/10052* (2013.01)

(58) Field of Classification Search
CPC ..................................................... H04N 23/90
USPC .......................................................... 348/47
See application file for complete search history.

(56) References Cited

U.S. PATENT DOCUMENTS 4,383,170 A 5/1983 Takagi et al.
4,694,185 A 9/1987 Weiss
(Continued)

FOREIGN PATENT DOCUMENTS

CN 1672626 A 9/2005
CN 101742347 A 6/2010
(Continued)

OTHER PUBLICATIONS

US 9,492,073 B2, 11/2016, Tesar et al. (withdrawn)
(Continued)

*Primary Examiner* — Yulin Sun
(74) *Attorney, Agent, or Firm* — Perkins Coie LLP

(57) ABSTRACT

A camera array for a mediated-reality system includes a plurality of hexagonal cells arranged in a honeycomb pattern in which a pair of inner cells include respective edges adjacent to each other and a pair of outer cells are separated from each other by the inner cells. A plurality of cameras are mounted within each of the plurality of hexagonal cells. The plurality of cameras include at least one camera of a first type and at least one camera of a second type. The camera of the first type may have a longer focal length than the camera of the second type.

20 Claims, 5 Drawing Sheets

Related U.S. Application Data continuation of application No. 16/582,855, filed on Sep. 25, 2019, now Pat. No. 10,623,660.

(60) Provisional application No. 62/737,791, filed on Sep. 27, 2018.

(51) Int. Cl.
*H04N 13/243* (2018.01)
*H04N 23/45* (2023.01)
*H04N 23/51* (2023.01)

(56) References Cited

U.S. PATENT DOCUMENTS

| | | |
|---|---|---|
| 5,334,991 A | 8/1994 | Wells et al. |
| 5,757,423 A | 5/1998 | Tanaka et al. |
| 5,876,325 A | 3/1999 | Mizuno et al. |
| 5,905,525 A | 5/1999 | Ishibashi et al. |
| 5,999,840 A | 12/1999 | Grimson et al. |
| 6,483,535 B1 | 11/2002 | Tamburrino et al. |
| 6,491,702 B2 | 12/2002 | Heilbrun et al. |
| 6,577,342 B1 | 6/2003 | Wester |
| 6,675,040 B1 | 1/2004 | Cosman |
| 6,985,765 B2 | 1/2006 | Morita et al. |
| 8,010,177 B2 | 8/2011 | Csavoy et al. |
| 8,041,089 B2 | 10/2011 | Drumm et al. |
| 8,179,604 B1 | 5/2012 | Prada et al. |
| 8,295,909 B2 | 10/2012 | Goldbach |
| 8,384,912 B2 | 2/2013 | Charny et al. |
| 8,548,563 B2 | 10/2013 | Simon et al. |
| 8,657,809 B2 | 2/2014 | Schoepp |
| 8,885,177 B2 | 11/2014 | Ben-yishai et al. |
| 8,914,472 B1 | 12/2014 | Lee et al. |
| 8,933,935 B2 | 1/2015 | Yang et al. |
| 9,119,670 B2 | 9/2015 | Yang et al. |
| 9,220,570 B2 | 12/2015 | Kim et al. |
| 9,237,338 B1 | 1/2016 | Maguire |
| 9,323,325 B2 | 4/2016 | Perez et al. |
| 9,462,164 B2 | 10/2016 | Venkataraman et al. |
| 9,497,380 B1 | 11/2016 | Jannard et al. |
| 9,503,709 B2 | 11/2016 | Shi et al. |
| 9,513,113 B2 | 12/2016 | Yang et al. |
| 9,618,621 B2 | 4/2017 | Barak et al. |
| 9,916,691 B2 | 3/2018 | Takano et al. |
| 9,918,066 B2 | 3/2018 | Schneider et al. |
| 9,967,475 B2 | 5/2018 | Schneider et al. |
| 10,074,177 B2 | 9/2018 | Piron et al. |
| 10,089,737 B2 | 10/2018 | Krieger et al. |
| 10,165,981 B2 | 1/2019 | Schoepp |
| 10,166,078 B2 | 1/2019 | Sela et al. |
| 10,166,079 B2 | 1/2019 | Mclachlin et al. |
| 10,194,131 B2 | 1/2019 | Casas |
| 10,244,991 B2 | 4/2019 | Shademan et al. |
| 10,345,582 B2 | 7/2019 | Schneider et al. |
| 10,353,219 B1 | 7/2019 | Hannaford et al. |
| 10,390,887 B2 | 8/2019 | Bischoff et al. |
| 10,398,514 B2 | 9/2019 | Ryan et al. |
| 10,424,118 B2 | 9/2019 | Hannemann et al. |
| 10,426,345 B2 | 10/2019 | Shekhar et al. |
| 10,426,554 B2 | 10/2019 | Siewerdsen et al. |
| 10,433,916 B2 | 10/2019 | Schneider et al. |
| 10,455,218 B2 | 10/2019 | Venkataraman et al. |
| 10,546,423 B2 | 1/2020 | Jones et al. |
| 10,575,906 B2 | 3/2020 | Wu |
| 10,650,573 B2 | 5/2020 | Youngquist et al. |
| 10,653,495 B2 | 5/2020 | Gregerson et al. |
| 10,657,664 B2 | 5/2020 | Yu |
| 10,664,903 B1 | 5/2020 | Haitani et al. |
| 10,667,868 B2 | 6/2020 | Malackowski |
| 10,682,188 B2 | 6/2020 | Leung et al. |
| 10,792,110 B2 | 10/2020 | Leung et al. |
| 10,799,315 B2 | 10/2020 | Leung et al. |
| 10,799,316 B2 | 10/2020 | Sela et al. |
| 10,810,799 B2 | 10/2020 | Tepper et al. |
| 10,828,114 B2 | 11/2020 | Abhari et al. |
| 10,832,408 B2 | 11/2020 | Srimohanarajah et al. |
| 10,918,444 B2 | 2/2021 | Stopp et al. |
| 10,925,465 B2 | 2/2021 | Tully et al. |
| 10,949,986 B1 | 3/2021 | Colmenares et al. |
| 10,973,581 B2 | 4/2021 | Mariampillai et al. |
| 11,179,218 B2 | 11/2021 | Calef et al. |
| 11,295,460 B1 | 4/2022 | Aghdasi et al. |
| 11,354,810 B2 | 6/2022 | Colmenares et al. |
| 11,612,307 B2 | 3/2023 | Smith et al. |
| 2001/0048732 A1 | 12/2001 | Wilson et al. |
| 2002/0065461 A1 | 5/2002 | Cosman |
| 2002/0075201 A1 | 6/2002 | Sauer et al. |
| 2002/0077533 A1 | 6/2002 | Bieger et al. |
| 2002/0082498 A1 | 6/2002 | Wendt et al. |
| 2002/0113756 A1 | 8/2002 | Tuceryan et al. |
| 2003/0209096 A1 | 11/2003 | Pandey et al. |
| 2003/0210812 A1 | 11/2003 | Khamene et al. |
| 2003/0227470 A1 | 12/2003 | Genc et al. |
| 2003/0227542 A1 | 12/2003 | Zhang et al. |
| 2004/0070823 A1 | 4/2004 | Radna et al. |
| 2004/0169673 A1 | 9/2004 | Crampe et al. |
| 2005/0046700 A1 | 3/2005 | Bracke |
| 2005/0070789 A1 | 3/2005 | Aferzon |
| 2005/0090730 A1 | 4/2005 | Cortinovis et al. |
| 2005/0203380 A1 | 9/2005 | Sauer et al. |
| 2005/0206583 A1 | 9/2005 | Lemelson et al. |
| 2006/0203959 A1 | 9/2006 | Spartiotis et al. |
| 2007/0046776 A1 | 3/2007 | Yamaguchi et al. |
| 2007/0121423 A1 | 5/2007 | Rioux |
| 2007/0236514 A1 | 10/2007 | Agusanto et al. |
| 2008/0004533 A1 | 1/2008 | Jansen et al. |
| 2009/0033588 A1 | 2/2009 | Kajita et al. |
| 2009/0085833 A1 | 4/2009 | Otsuki |
| 2009/0303321 A1 | 12/2009 | Olson et al. |
| 2010/0045783 A1 | 2/2010 | State et al. |
| 2010/0076306 A1 | 3/2010 | Daigneault et al. |
| 2010/0099981 A1 | 4/2010 | Fishel |
| 2010/0295924 A1 | 11/2010 | Miyatani et al. |
| 2010/0329358 A1 | 12/2010 | Zhang et al. |
| 2011/0015518 A1 | 1/2011 | Schmidt et al. |
| 2011/0098553 A1 | 4/2011 | Robbins et al. |
| 2011/0115886 A1 | 5/2011 | Nguyen et al. |
| 2012/0050562 A1 | 3/2012 | Perwass et al. |
| 2012/0068913 A1 | 3/2012 | Bar-zeev et al. |
| 2012/0218301 A1 | 8/2012 | Miller |
| 2013/0002827 A1 | 1/2013 | Lee et al. |
| 2013/0050432 A1 | 2/2013 | Perez et al. |
| 2013/0058591 A1 | 3/2013 | Nishiyama et al. |
| 2013/0076863 A1 | 3/2013 | Rappel et al. |
| 2013/0084970 A1 | 4/2013 | Geisner et al. |
| 2013/0088489 A1 | 4/2013 | Schmeitz et al. |
| 2013/0135180 A1 | 5/2013 | Mcculloch et al. |
| 2013/0135515 A1 | 5/2013 | Abolfadl et al. |
| 2013/0141419 A1 | 6/2013 | Mount et al. |
| 2013/0222369 A1 | 8/2013 | Huston et al. |
| 2013/0265485 A1 | 10/2013 | Kang et al. |
| 2013/0274596 A1 | 10/2013 | Azizian et al. |
| 2013/0307855 A1 | 11/2013 | Lamb et al. |
| 2013/0335600 A1* | 12/2013 | Gustavsson .......... H04N 5/2621 348/239 |
| 2014/0005485 A1 | 1/2014 | Tesar et al. |
| 2014/0031668 A1 | 1/2014 | Mobasser et al. |
| 2014/0092281 A1 | 4/2014 | Nisenzon et al. |
| 2014/0192187 A1 | 7/2014 | Atwell et al. |
| 2014/0232831 A1* | 8/2014 | Shi .................. H04N 13/243 348/48 |
| 2014/0375772 A1 | 12/2014 | Gabara |
| 2015/0055929 A1 | 2/2015 | Van Hoff et al. |
| 2015/0173846 A1 | 6/2015 | Schneider et al. |
| 2015/0201176 A1 | 7/2015 | Graziosi et al. |
| 2015/0244903 A1 | 8/2015 | Adams |
| 2015/0348580 A1* | 12/2015 | van Hoff .............. H04N 13/271 348/48 |
| 2016/0073080 A1 | 3/2016 | Wagner et al. |
| 2016/0080734 A1 | 3/2016 | Aguirre-valencia |
| 2016/0091705 A1 | 3/2016 | Ben Ezra et al. |
| 2016/0191815 A1* | 6/2016 | Annau ............... G06Q 30/0263 348/38 |
| 2016/0191887 A1 | 6/2016 | Casas |

(56) References Cited

U.S. PATENT DOCUMENTS

| | | |
|---|---|---|
| 2016/0217760 A1 | 7/2016 | Chu et al. |
| 2016/0225192 A1 | 8/2016 | Jones et al. |
| 2016/0253809 A1 | 9/2016 | Cole et al. |
| 2016/0307372 A1 | 10/2016 | Pitts et al. |
| 2016/0317035 A1 | 11/2016 | Hendriks et al. |
| 2016/0352982 A1 | 12/2016 | Weaver et al. |
| 2017/0007334 A1 | 1/2017 | Crawford et al. |
| 2017/0068081 A1 | 3/2017 | Hirayama |
| 2017/0085855 A1 | 3/2017 | Roberts et al. |
| 2017/0099479 A1 | 4/2017 | Browd et al. |
| 2017/0109931 A1 | 4/2017 | Knorr et al. |
| 2017/0167702 A1 | 6/2017 | Mariampillai et al. |
| 2017/0186183 A1 | 6/2017 | Armstrong et al. |
| 2017/0188011 A1 | 6/2017 | Panescu et al. |
| 2017/0202626 A1 | 7/2017 | Kula et al. |
| 2017/0237971 A1 | 8/2017 | Pitts |
| 2017/0296293 A1 | 10/2017 | Mak et al. |
| 2017/0318235 A1 | 11/2017 | Schneider et al. |
| 2017/0359565 A1 | 12/2017 | Ito |
| 2018/0012413 A1 | 1/2018 | Jones et al. |
| 2018/0018827 A1 | 1/2018 | Stafford et al. |
| 2018/0070009 A1 | 3/2018 | Baek et al. |
| 2018/0078316 A1 | 3/2018 | Schaewe et al. |
| 2018/0082482 A1 | 3/2018 | Motta et al. |
| 2018/0091796 A1 | 3/2018 | Nelson et al. |
| 2018/0097867 A1 | 4/2018 | Pang et al. |
| 2018/0239948 A1 | 8/2018 | Rutschman et al. |
| 2018/0263706 A1 | 9/2018 | Averbuch |
| 2018/0263707 A1 | 9/2018 | Sela et al. |
| 2018/0263710 A1 | 9/2018 | Sakaguchi et al. |
| 2018/0293744 A1 | 10/2018 | Yu |
| 2018/0302572 A1 | 10/2018 | Barnes |
| 2019/0038362 A1 | 2/2019 | Nash et al. |
| 2019/0058870 A1 | 2/2019 | Rowell et al. |
| 2019/0080519 A1 | 3/2019 | Osman |
| 2019/0094545 A1 | 3/2019 | Lo et al. |
| 2019/0158799 A1 | 5/2019 | Gao et al. |
| 2019/0158813 A1 | 5/2019 | Rowell et al. |
| 2019/0183584 A1 | 6/2019 | Schneider et al. |
| 2019/0209080 A1 | 7/2019 | Gullotti et al. |
| 2019/0235210 A1 | 8/2019 | Nakai et al. |
| 2019/0260930 A1 | 8/2019 | Van Hoff et al. |
| 2019/0282307 A1 | 9/2019 | Azizian et al. |
| 2019/0289284 A1* | 9/2019 | Smith ............ A61B 1/00193 |
| 2019/0290366 A1 | 9/2019 | Pettersson et al. |
| 2019/0328465 A1 | 10/2019 | Li et al. |
| 2019/0336222 A1 | 11/2019 | Schneider et al. |
| 2019/0350658 A1 | 11/2019 | Yang et al. |
| 2020/0005521 A1 | 1/2020 | Youngquist et al. |
| 2020/0059640 A1 | 2/2020 | Browd et al. |
| 2020/0084430 A1 | 3/2020 | Kalarn et al. |
| 2020/0105065 A1 | 4/2020 | Youngquist et al. |
| 2020/0154049 A1 | 5/2020 | Steuart |
| 2020/0170718 A1 | 6/2020 | Peine |
| 2020/0197100 A1 | 6/2020 | Leung et al. |
| 2020/0197102 A1 | 6/2020 | Shekhar et al. |
| 2020/0242755 A1 | 7/2020 | Schneider et al. |
| 2020/0296354 A1 | 9/2020 | Bickerstaff et al. |
| 2020/0297427 A1 | 9/2020 | Cameron et al. |
| 2020/0342673 A1 | 10/2020 | Lohr et al. |
| 2020/0352651 A1 | 11/2020 | Junio et al. |
| 2020/0405433 A1 | 12/2020 | Sela et al. |
| 2021/0037232 A1 | 2/2021 | Lin et al. |
| 2021/0038340 A1 | 2/2021 | Itkowitz et al. |
| 2021/0045618 A1 | 2/2021 | Stricko et al. |
| 2021/0045813 A1 | 2/2021 | Wickham et al. |
| 2021/0077195 A1 | 3/2021 | Saeidi et al. |
| 2021/0145517 A1 | 5/2021 | Pierrepont et al. |
| 2021/0186355 A1 | 6/2021 | Ben-yishai et al. |
| 2021/0192763 A1 | 6/2021 | Liu et al. |
| 2021/0196385 A1 | 7/2021 | Shelton et al. |
| 2021/0382559 A1 | 12/2021 | Segev et al. |
| 2022/0012954 A1 | 1/2022 | Buharin |
| 2022/0020160 A1 | 1/2022 | Buharin |
| 2022/0174261 A1 | 6/2022 | Hornstein et al. |

FOREIGN PATENT DOCUMENTS

| | | |
|---|---|---|
| CN | 104918572 A | 9/2015 |
| CN | 204854653 U | 12/2015 |
| EP | 1027627 A1 | 8/2000 |
| EP | 1504713 B1 | 7/2008 |
| EP | 2139419 A1 | 1/2010 |
| EP | 2372999 A1 | 10/2011 |
| EP | 3077956 A4 | 4/2017 |
| EP | 1924197 B1 | 10/2017 |
| EP | 3197382 A4 | 6/2018 |
| EP | 2852326 B1 | 12/2018 |
| EP | 3102141 B1 | 8/2019 |
| EP | 3076892 B1 | 10/2019 |
| EP | 2903551 B1 | 11/2021 |
| EP | 3824621 A4 | 4/2022 |
| IL | 262619 A | 4/2020 |
| JP | 2007528631 A | 10/2007 |
| JP | 2011248723 A | 12/2011 |
| JP | 2015524202 A | 8/2015 |
| WO | 2001005161 A1 | 1/2001 |
| WO | 2003002011 A1 | 1/2003 |
| WO | 2005081547 A1 | 9/2005 |
| WO | 2007115825 A1 | 10/2007 |
| WO | 2008130354 A1 | 10/2008 |
| WO | 2008130355 A1 | 10/2008 |
| WO | 2010067267 A1 | 6/2010 |
| WO | 2013082387 A1 | 6/2013 |
| WO | 2013180748 A1 | 12/2013 |
| WO | 2014037953 A2 | 3/2014 |
| WO | 2015084462 A1 | 6/2015 |
| WO | 2015151447 A1 | 10/2015 |
| WO | 2015179446 A1 | 11/2015 |
| WO | 2016044934 A1 | 3/2016 |
| WO | 2017042171 A1 | 3/2017 |
| WO | 2018097831 A1 | 5/2018 |
| WO | 2020018931 A1 | 1/2020 |
| WO | 2020069403 A1 | 4/2020 |
| WO | 2020163316 A1 | 8/2020 |
| WO | 2021003401 A1 | 1/2021 |
| WO | 2021231337 A1 | 11/2021 |

OTHER PUBLICATIONS

European Patent Office, Extended European Search Report and Opinion, EP Patent Application No. 19864255.5, Jun. 14, 2022, eight pages.

PCT International Search Report and Written Opinion, PCT Application No. PCT/US19/53300, Dec. 19, 2019, 15 pages.

United States Office Action, U.S. Appl. No. 16/808,194, May 13, 2021, eight pages.

OpenVC 4.1.1, Open Source Computer Vision, Jul. 26, 2019, http://opencv.org/ [retrieved Nov. 13, 2019] 2 pages.

Point Closest to as Set Four of Lines in 3D, Postin in Mathematics Stack Exchange, May 2, 2011, https://math.stackexchange.com/questions/36398/point-closest-t-a-set-four-of-lines-in-3d/55286#55286 [retrieved Aug. 15, 2019], 3 pages.

Road to VR, <http://www.roadlovr.com/wp-content/uploads/2016/01/htc-vive-pre-system.jpg. [retrieved Nov. 13, 2019].

Eade Ethan,"Lie Groups for 2D and 3D Transformations," 2013, updated May 20, 2017, www.ethaneade.com [retrieved Nov. 13, 2019] 25 pages.

Extended European Search Report mailed Dec. 8, 2017 in European Patent Application No. 15795790.3, 10 pages.

Extended European Search Report mailed May 29, 2020 in European Patent Application No. 16922208.0, 11 pages.

Geng, Jason, "Structured-light 3D surface imaging: a tutorial," Advances in Optics and Photonics 3:125-160, Jun. 2011.

Gortler et al. "The Lumigraph," Proceedings of the 23rd Annual Conference on Computer Graphics and Interactive Techniques (ACM 1996), pp. 43-54.

Herakleous et al. "3DUnderworld—SLC: An-Open Source Structured-Light Scanning System for Rapid Geometry Acquisition," arXiv prepring arXiv: 1406.6595v1 (2014), Jun. 26, 2014, 28 pages.

(56) References Cited

OTHER PUBLICATIONS

International Search Report and Written Opinion mailed Aug. 18, 2015 in corresponding International Application No. PCT/US2015/031637, 11 pages.
International Search Report and Written Opinion mailed Nov. 18, 2021 in corresponding International Application No. PCT/US2021/031653, 2 pages.
International Search Report and Written Opinion received in Application No. PCT/US21/31653, dated Jun. 30, 2021, 17 pages.
Kang et al. "Stereoscopic augmented reality for laparoscopic surgery," Surgical Endoscopy, 2014 28(7):2227-2235, 2014.
Levoy et al. "Light Field Rendering," Proceedings of the 23rd Annual Conference on Computer Graphics and Interactive Techniques (ACM 1996), pp. 31-42.
Levoy et al. "Light Filed Microscopy," ACM Transactions on Graphic 25(3), Proceedings of Siggraph 2006.
Luke et al. "Near Real-Time Estimation of Super-Resolved Depth and All-in-Focus Images from a Plenoptic Camera Using Graphics Processing Units," International Journal of Digital Multimedia Broadcasting, 2010, 1-12, Jan. 2010.
Mezzana et al. "Augmented Reality in Ocuplastic Surgery: First iPhone Application," Plastic and Reconstructive Surgery, Mar. 2011, pp. 57e-58e.
Multiscale gigapixel photography, D. J. Brady, M. E. Gehm, R. A. Stack, D. L. Marks, D. S. Kittle, D. R. Golish, E. M. Vera, S. D. Feller, Nature 486, 386-389 (Jun. 21, 2012) doi:10.1038/nature11150.
Ng et al. "Light Field Photography with a Hand-held Plenoptic Camera," Stanford Tech Report CTSR 2005.
Suenaga et al. "Real-time in situ three-dimensional integral videography and surgical navigation using augmented reality: a pilot study," International Journal of Oral Science, 2013, 5:98-102.
Tremblay et al. "Ultrathin cameras using annular folded optics," Applied Optics, Feb. 1, 2007, 46(4):463-471.
U.S. Appl. No. 16/457,780, titled "Synthesizing an Image From a Virtual Perspective Using Pixels From a Physical Imager Array Weighted Based on Depth Error Sensitivity," filed Jun. 28, 2019.
U.S. Appl. No. 17/140,885, titled "Methods and Systems for Registering Preoperative Image Data to Intraoperative Image Data of a Scene, Such as a Surgical Scene," filed Jan. 4, 2021.
User1551, "Point closest to a set four of lines in 3D," posting in Mathematics Stack Exchange, Apr. 25, 2016, <http:math.stackexchange.com/users/1551/user1551> [retrieved Aug. 15, 2019] 3 pages.

* cited by examiner

CAMERA ARRAY FOR A MEDIATED-REALITY SYSTEM

CROSS-REFERENCE TO RELATED APPLICATIONS

This application is a continuation of U.S. application Ser. No. 16/808,194, filed Mar. 3, 2020, which is a continuation of U.S. application Ser. No. 16/582,855, filed Sep. 25, 2019, now U.S. Pat. No. 10,623,660, which application claims the benefit of U.S. Provisional Application No. 62/737,791 filed on Sep. 27, 2018, all of which are incorporated by reference herein.

BACKGROUND

Technical Field

The disclosed embodiments relate generally to a camera array, and more specifically, to a camera array for generating a virtual perspective of a scene for a mediated-reality viewer.

Description of the Related Art

In a mediated reality system, an image processing system adds, subtracts, or modifies visual information representing an environment. For surgical applications, a mediated reality system may enable a surgeon to view a surgical site from a desired perspective together with contextual information that assists the surgeon in more efficiently and precisely performing surgical tasks.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

OVERVIEW

A camera array includes a plurality of hexagonal cells arranged in a honeycomb pattern in which a pair of inner cells include respective edges adjacent to each other and a pair of outer cells are separated from each other by the inner cells. A plurality of cameras is mounted within each of the plurality of hexagonal cells. The plurality of cameras includes at least one camera of a first type and at least one camera of a second type. For example, the camera of the first type may have a longer focal length than the camera of the second type. The plurality of cameras within each of the plurality of hexagonal cells are arranged in a triangular grid approximately equidistant from neighboring cameras. In an embodiment, at least one camera of the second type within each of the plurality of hexagonal cells is at a position further from or equidistant from a center point of the camera array relative to cameras of the first type.

Mediated-Reality System

Figure 1:
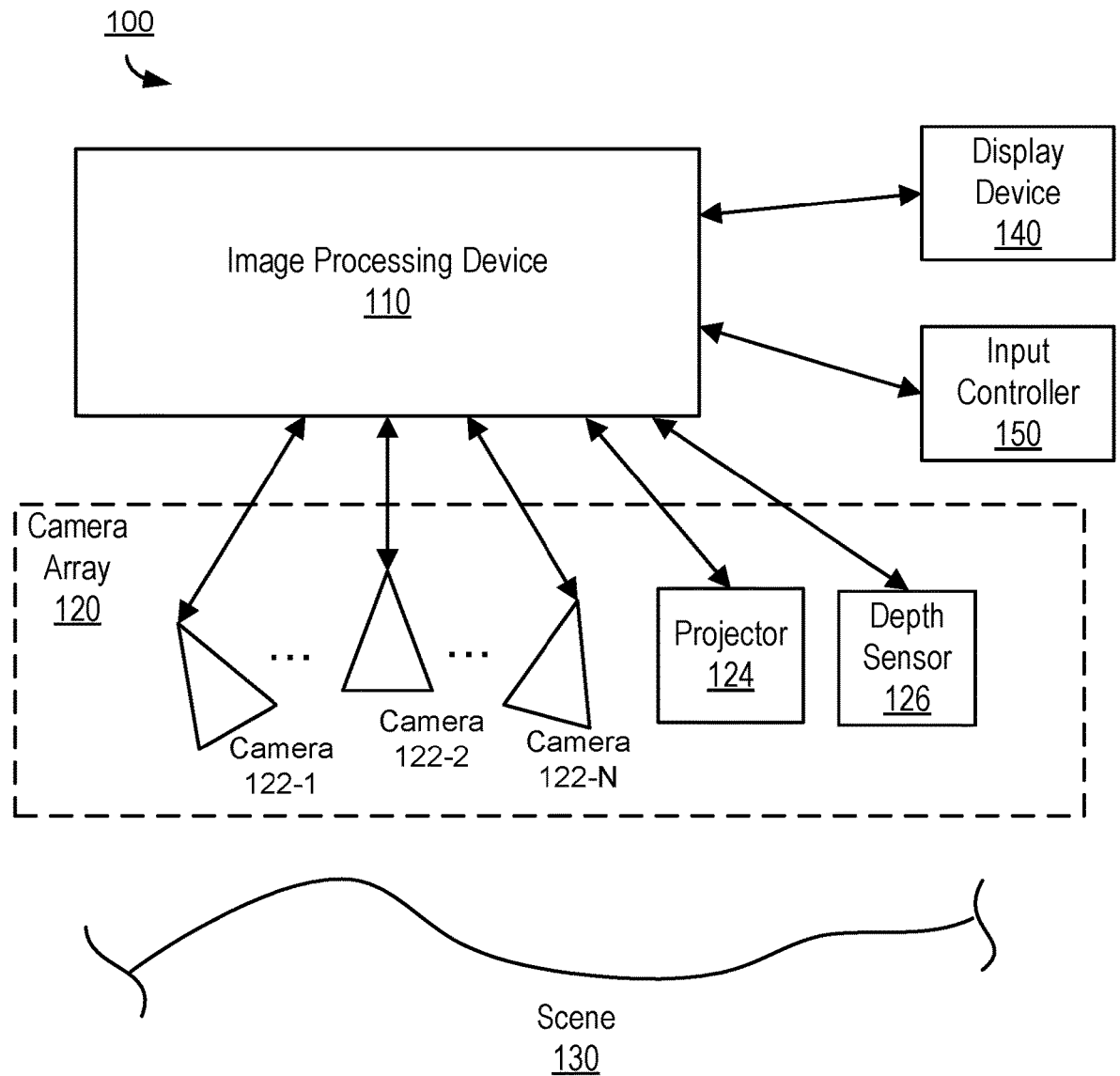
FIG. 1 is a block diagram illustrating an example embodiment of an imaging system.

FIG. 1 illustrates an example embodiment of a mediated-reality system 100. The mediated-reality system 100 comprises an image processing device 110, a camera array 120, a display device 140, and an input controller 150. In alternative embodiments, the mediated-reality system 100 may comprise additional or different components.

The camera array 120 comprises a plurality of cameras 122 (e.g., a camera 122-1, a camera 122-2, . . . , a camera 122-N) that each capture respective images of a scene 130. The cameras 122 may be physically arranged in a particular configuration as described in further detail below such that their physical locations and orientations relative to each other are fixed. For example, the cameras 122 may be structurally secured by a mounting structure to mount the cameras 122 at predefined fixed locations and orientations. The cameras 122 of the camera array 120 may be positioned such that neighboring cameras may share overlapping views of the scene 130. The cameras 122 in the camera array 120 may furthermore be synchronized to capture images of the scene 130 substantially simultaneously (e.g., within a threshold temporal error). The camera array 120 may furthermore comprise one or more projectors 124 that projects a structured light pattern onto the scene 130. The camera array 120 may furthermore comprise one or more depth sensors 126 that perform depth estimation of a surface of the scene 150.

The image processing device 110 receives images captured by the camera array 120 and processes the images to synthesize an output image corresponding to a virtual camera perspective. Here, the output image corresponds to an approximation of an image of the scene 130 that would be captured by a camera placed at an arbitrary position and orientation corresponding to the virtual camera perspective. The image processing device 110 synthesizes the output image from a subset (e.g., two or more) of the cameras 122 in the camera array 120, but does not necessarily utilize images from all of the cameras 122. For example, for a given virtual camera perspective, the image processing device 110 may select a stereoscopic pair of images from two cameras 122 that are positioned and oriented to most closely match the virtual camera perspective.

The image processing device 110 may furthermore perform a depth estimation for each surface point of the scene 150. In an embodiment, the image processing device 110 detects the structured light projected onto the scene 130 by the projector 124 to estimate depth information of the scene. Alternatively, or in addition, the image processing device 110 includes dedicated depth sensors 126 that provide depth information to the image processing device 110. In yet other embodiments, the image processing device 110 may estimate depth only from multi-view image data without necessarily utilizing any projector 124 or depth sensors 126.

The depth information may be combined with the images from the cameras 122 to synthesize the output image as a three-dimensional rendering of the scene as viewed from the virtual camera perspective.

In an embodiment, functions attributed to the image processing device 110 may be practically implemented by two or more physical devices. For example, in an embodiment, a synchronization controller controls images displayed by the projector 124 and sends synchronization signals to the cameras 122 to ensure synchronization between the cameras 122 and the projector 124 to enable fast, multi-frame, multi-camera structured light scans. Additionally, this synchronization controller may operate as a parameter server that stores hardware specific configurations such as parameters of the structured light scan, camera settings, and camera calibration data specific to the camera configuration of the camera array 120. The synchronization controller may be implemented in a separate physical device from a display controller that controls the display device 140, or the devices may be integrated together.

The virtual camera perspective may be controlled by an input controller 150 that provides a control input corresponding to the location and orientation of the virtual imager perspective. The output image corresponding to the virtual camera perspective is outputted to the display device 140 and displayed by the display device 140. The image processing device 110 may beneficially process received inputs from the input controller 150 and process the captured images from the camera array 120 to generate output images corresponding to the virtual perspective in substantially real-time as perceived by a viewer of the display device 140 (e.g., at least as fast as the frame rate of the camera array 120).

The image processing device 110 may comprise a processor and a non-transitory computer-readable storage medium that stores instructions that when executed by the processor, carry out the functions attributed to the image processing device 110 as described herein.

The display device 140 may comprise, for example, a head-mounted display device or other display device for displaying the output images received from the image processing device 110. In an embodiment, the input controller 150 and the display device 140 are integrated into a head-mounted display device and the input controller 150 comprises a motion sensor that detects position and orientation of the head-mounted display device. The virtual perspective can then be derived to correspond to the position and orientation of the head-mounted display device such that the virtual perspective corresponds to a perspective that would be seen by a viewer wearing the head-mounted display device. Thus, in this embodiment, the head-mounted display device can provide a real-time rendering of the scene as it would be seen by an observer without the head-mounted display. Alternatively, the input controller 150 may comprise a user-controlled control device (e.g., a mouse, pointing device, handheld controller, gesture recognition controller, etc.) that enables a viewer to manually control the virtual perspective displayed by the display device.

Figure 2:
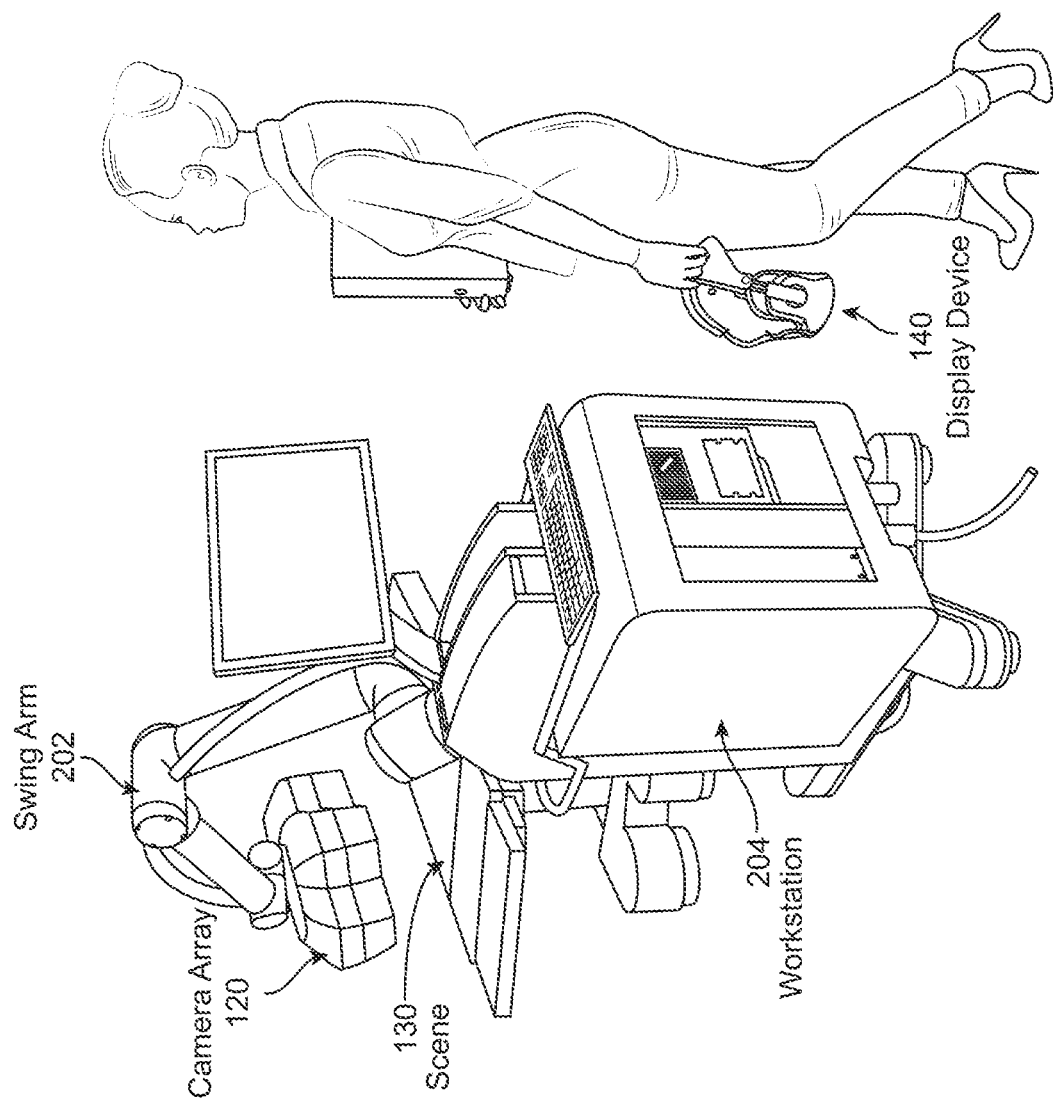
FIG. 2 is an example of a surgical environment employing the imaging system for mediated-reality assisted surgery.

FIG. 2 illustrates an example embodiment of the mediated-reality system 100 for a surgical application. Here, an embodiment of the camera array 120 is positioned over the scene 130 (in this case, a surgical site) and can be positioned via a swing arm 202 attached to a workstation 204. The swing arm 202 may be manually moved or may be robotically controlled in response to the input controller 150. The display device 140 in this example is embodied as a virtual reality headset. The workstation 204 may include a computer to control various functions of the camera array 120 and the display device 140, and may furthermore include a secondary display that can display a user interface for performing various configuration functions, or may mirror the display on the display device 140. The image processing device 120 and the input controller 150 may each be integrated in the workstation 204, the display device 140, or a combination thereof.

Figure 3:
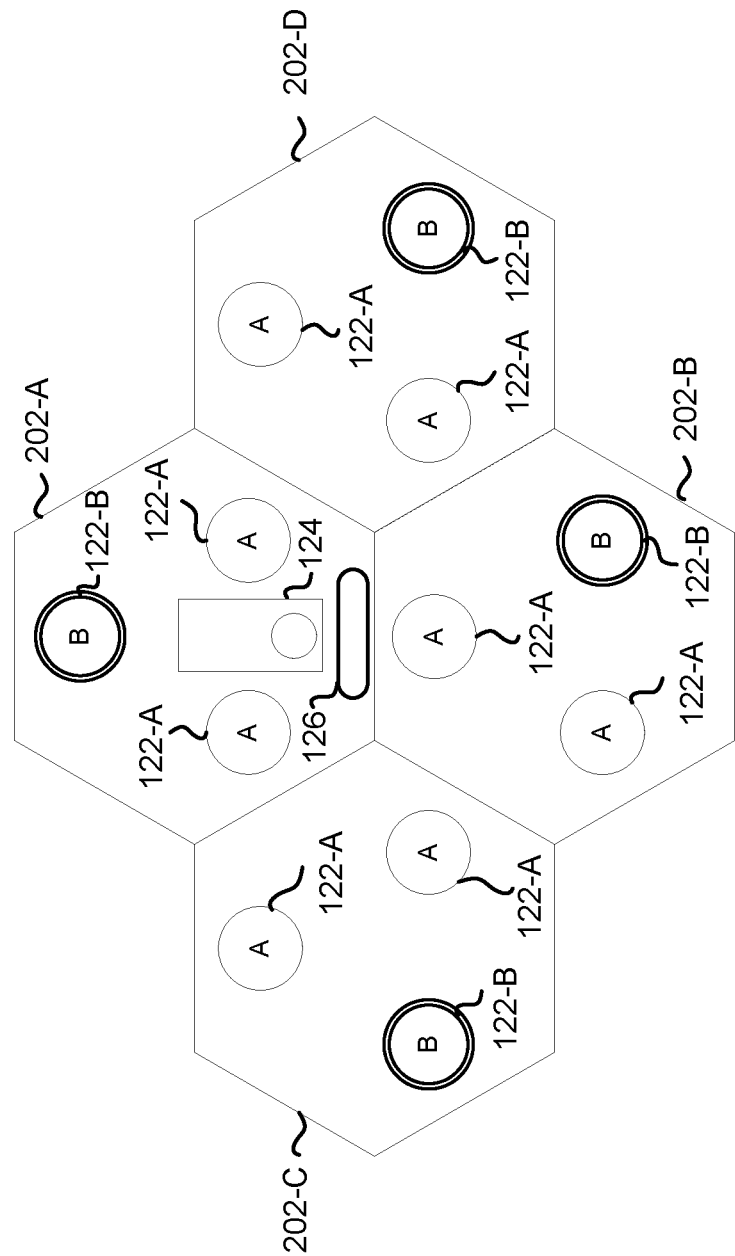
FIG. 3 is simplified cross-sectional view of an example embodiment of a camera array.

FIG. 3 illustrates a bottom plan view of an example embodiment of a camera array 120. The camera array 120 include a plurality of cells 202 (e.g., four cells) each comprising one or more cameras 122. In an embodiment, the cells 202 each have a hexagonal cross-section and are positioned in a honeycomb pattern. Particularly, two inner cells 202-A, 202-B are each positioned adjacent to other cells 202 along three adjacent edges, while two outer cells 202-C, 202-D are each positioned adjacent to other cells 202 along only two adjacent edges. The inner cells 202-A, 202-B are positioned to have respective edges adjacent to each other and may share a side wall, while the outer cells 202-C, 202-D are separated from each other (are not in direct contact). Here, the outer cells 202-C, 202-D may each have a respective pair of edges that are adjacent to respective edges of the inner cells 202-A, 202-B. Another feature of the illustrated cell arrangement is that the outer cells 202-C, 202-D each include four edges that form part of the outer perimeter of the camera array 120 and the inner cells 202-A, 202-B each include three edges that form part of the outer perimeter of the camera array 120.

The hexagonal shape of the cells 202 provides several benefits. First, the hexagonal shape enables the array 120 to be expanded to include additional cells 202 in a modular fashion. For example, while the example camera array 120 includes four cells 202, other embodiments of the camera array 120 could include, for example eight or more cells 202 by positioning additional cells 202 adjacent to the outer edges of the cells 202 in a honeycomb pattern. By utilizing a repeatable pattern, camera arrays 120 of arbitrary size and number of cameras 120 can be manufactured using the same cells 202. Furthermore, the repeatable pattern can ensure that spacing of the cameras 122 is predictable, which enables the image processor 120 to process images from different sizes of camera arrays 120 with different numbers of cameras 122 without significant modification to the image processing algorithms.

In an embodiment, the walls of the cells 202 are constructed of a rigid material such as metal or a hard plastic. The cell structure provides strong structural support for holding the cameras 122 in their respective positions without significant movement due to flexing or vibrations of the array structure.

In an embodiment, each cell 202 comprises a set of three cameras 122 arranged in a triangle pattern with all cameras 122 oriented to focus on a single point. In an embodiment, each camera 122 is approximately equidistant from each of its neighboring cameras 122 within the cell 202 and approximately equidistant from neighboring cameras 122 in adjacent cells 202. This camera spacing results in a triangular grid, where each set of three neighboring cameras 122 are arranged in triangle of approximately equal dimensions. This spacing simplifies the processing performed by the image processing device 110 when synthesizing the output image corresponding to the virtual camera perspective. The triangular grid furthermore allows for a dense packing of cameras 122 within a limited area. Furthermore, the triangular grid enables the target volume to be captured with a uniform sampling rate to give smooth transitions between camera pixel weights and low variance in generated image quality based on the location of the virtual perspective.

In an embodiment, each cell 202 comprises cameras 122 of at least two different types. For example, in an embodiment, each cell 202 includes two cameras 122-A of a first type (e.g., type A) and one camera 122-B of a second type (e.g., type B). In an embodiment, the type A cameras 122-A and the type B cameras 122-B have different focal lengths. For example, the type B cameras 122-B may have a shorter focal length than the type A cameras 122-A. In a particular example, the type A cameras 122-A have 50 mm lenses while the type B cameras 122-B have 35 mm lenses. In an embodiment, the type B cameras 122-B are generally positioned in their respective cells 202 in the camera position furthest from a center point of the array 120.

The type B cameras 122-B have a larger field-of-view and provide more overlap of the scene 130 than the type A cameras 122-A. The images captured from these cameras 122-B are useful to enable geometry reconstruction and enlargement of the viewable volume. The type A cameras 122-A conversely have a smaller field-of-view and provide more angular resolution to enable capture of smaller details than the type B cameras 122-B. In an embodiment, the type A cameras occupy positions in the center of the camera array 120 so that when points of interest in the scene 150 (e.g., a surgical target) are placed directly below the camera array 120, the captured images will benefit from the increased detail captured by the type A cameras 122-A relative to the type B cameras 122-B. Furthermore, by positioning the type B cameras 122-B along the exterior of the array 120, a wide baseline between the type B cameras 122-B is achieved, which provides the benefit of enabling accurate stereoscopic geometry reconstruction. For example, in the cells 202-A, 202-C, 202-D, the type B camera 122-B is at the camera position furthest from the center of the array 120. In the case of a cell 202-B having two cameras equidistant from the center point, one of the camera positions may be arbitrarily selected for the type B camera 122-B. In an alternative embodiment, the type B cameras 122-B may occupy the other camera position equidistant from the center of the array 120.

In an embodiment, the camera array 120 further includes a projector 124 that can project structured light onto the scene 130. The projector 124 may be positioned near a center line of the camera array 120 in order to provide desired coverage of the scene 130. The projector 124 may provide illumination and project textures and other patterns (e.g., to simulate a laser pointer or apply false or enhanced coloring to certain regions of the scene 150). In an embodiment, the camera array 120 may also include depth sensors 126 adjacent to the projector 124 to use for depth estimation and object tracking.

Figure 4:
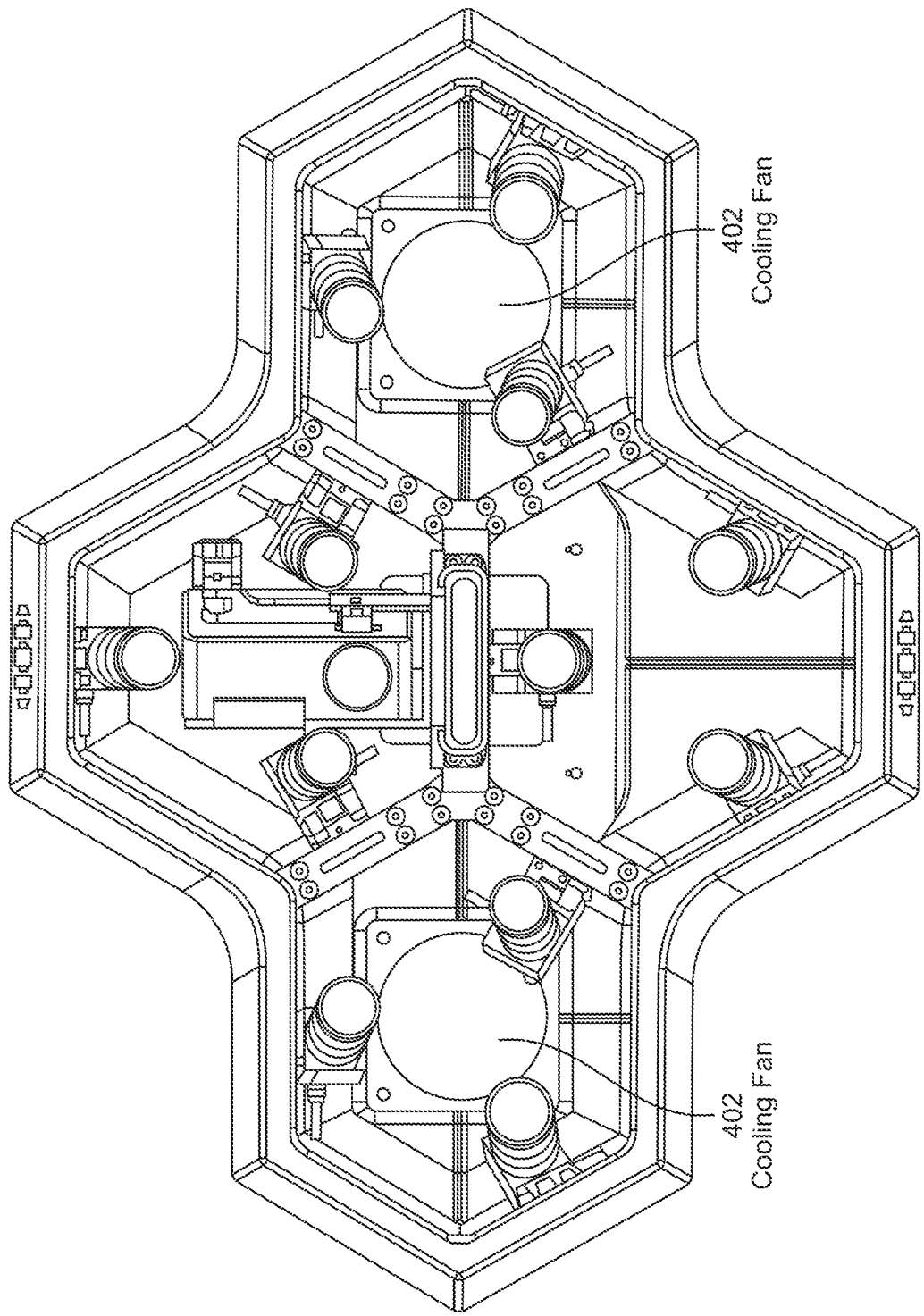
FIG. 4 is a detailed bottom view of an example embodiment of a camera array.

FIG. 4 illustrates a more detailed bottom plan view of an embodiment of a camera array 120. In this view, the orientation of the cameras can be seen as pointing towards a centrally located focal point. Furthermore, in this embodiment, the type A cameras 122-A are 50 mm focal length cameras and the type B cameras 122-B are 35 mm focal length cameras. As further illustrated in this view, an embodiment of the camera array 120 may include one or more cooling fans to provide cooling to the camera array 120. For example, in one embodiment, a pair of fans may be positioned in the outer cells 202-C, 202-D of the camera array 120. In an alternative embodiment, the camera array 120 may incorporate off-board cooling via tubing that carries cool air to the camera array 120 and/or warm air away from the camera array 120. This embodiment may be desirable to comply with restrictions on airflow around a patient in an operating room setting.

Figure 5:
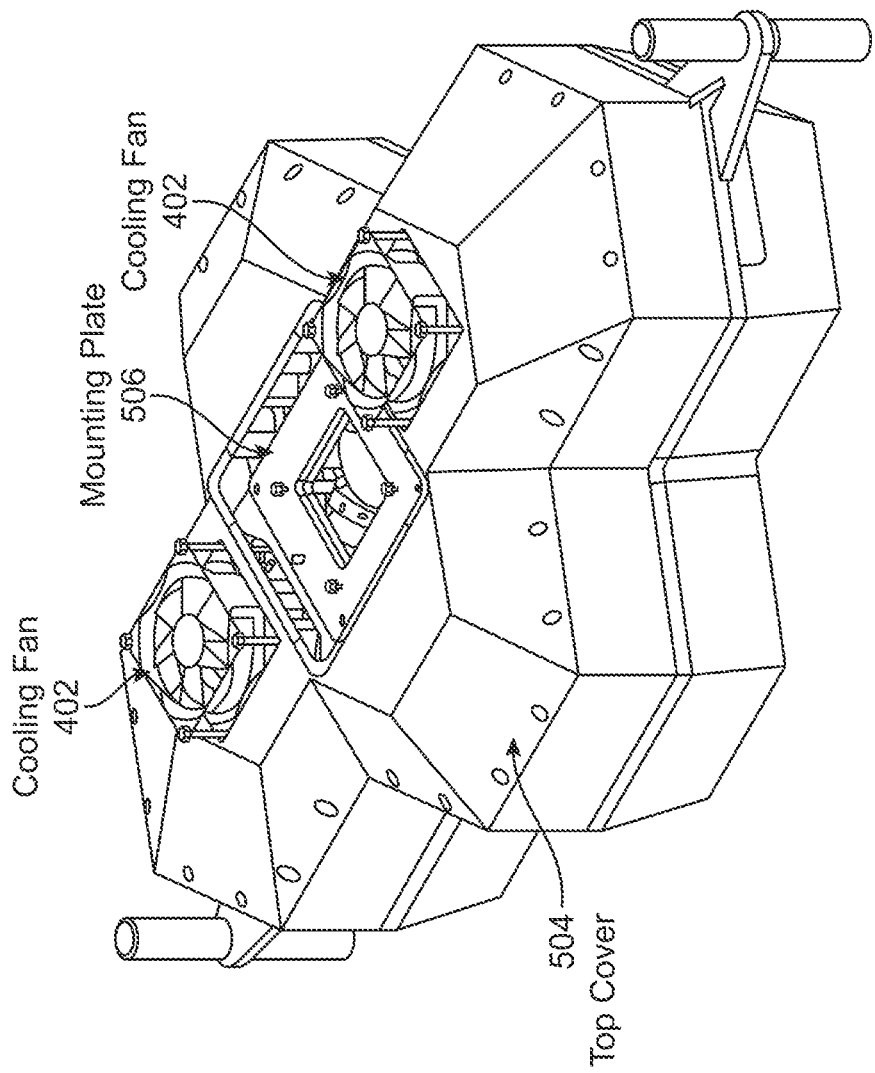
FIG. 5 is a top perspective view of an example embodiment of a camera array.

FIG. 5 illustrates a perspective view of the camera array 120. In this view, a top cover 504 is illustrated to cover the hexagonal cells 202 and provide structural support to the camera array 120. Additionally, the top cover may include a mounting plate 506 for coupling to a swing arm 202 as illustrated in FIG. 2. The top cover 504 may further include mounting surfaces on the outer cells 202-C, 202-D for mounting the fans 402.

Upon reading this disclosure, those of skill in the art will appreciate still additional alternative structural and functional designs for the disclosed embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and system disclosed herein without departing from the scope of the described embodiments.

The invention claimed is:

1. A mediated-reality system, comprising:
a camera array to capture a plurality of images of a scene, the camera array including:
a plurality of cameras mounted within each of a plurality of cells and arranged in a same pattern within each of the plurality of cells, the plurality of cameras including at least one camera of a first focal length and at least one camera of a second focal length different than the first focal length, wherein the first focal length is longer than the second focal length, and at least one camera of the second focal length within each of the plurality of cells is at a position further from or equidistant from a center point of the camera array relative to cameras of the first focal length;
an image processing device to synthesize a virtual image corresponding to a virtual perspective of the scene based on at least two of the plurality of images; and
a display device to display the virtual image.

2. The mediated-reality system of claim 1, wherein the first focal length is 50 mm and the second focal length is 35 mm.

3. The mediated-reality system of claim 1, further comprising:
a projector configured to project structured light onto a portion of the scene that is within a field of view of the camera array.

4. The mediated-reality system of claim 1, further comprising:
a depth sensor configured to sense a distance to a surface within the scene, the surface within a field of view of the camera array.

5. The mediated-reality system of claim 1, wherein the scene is a surgical site.

6. The mediated-reality system of claim 1, wherein the display device is part of a head-mounted display (HMD) that is configured to present the virtual image based in part on a position and orientation of the HMD.

7. The mediated-reality system of claim 1, further comprising:
a swing arm configured to position the camera array to capture the plurality of images of the scene.

8. A method comprising:
capturing, via a camera array, a plurality of images of a scene, the camera array including a plurality of cameras mounted within each of a plurality of cells and arranged in a same pattern within each of the plurality of cells, the plurality of cameras including at least one camera of a first focal length and at least one camera of a second focal length different than the first focal length, wherein the first focal length is longer than the second focal length, and at least one camera of the second focal length within each of the plurality of cells is at a position further from or equidistant from a center point of the camera array relative to cameras of the first focal length;
synthesizing a virtual image corresponding to a virtual perspective based on at least two of the plurality of images of the scene; and
displaying the virtual image.

9. The method of claim 8, wherein the first focal length is 50 mm and the second focal length is 35 mm.

10. The method of claim 8, further comprising:
projecting, via a projector, structured light onto a portion of the scene that is within a field of view of the camera array.

11. The method of claim 8, further comprising:
sensing, via a depth sensor, a distance to a surface within the scene, the surface within a field of view of the camera array.

12. The method of claim 8, wherein the scene is a surgical site.

13. The method of claim 8, wherein displaying the virtual image comprises:
presenting, via a head-mounted display (HMD), the virtual image based in part on a position and orientation of the HMD.

14. The method of claim 8, further comprising:
receiving an instruction to position a swing arm coupled to the camera array; and
positioning, via the swing arm, the camera array to capture the plurality of images of the scene.

15. A non-transitory computer readable medium configured to store program code instructions, when executed by a processor of a mediated-reality system, cause the mediated-reality system to perform steps comprising:
capturing, via a camera array, a plurality of images of a scene, the camera array including a plurality of cameras mounted within each of a plurality of cells and arranged in a same pattern within each of the plurality of cells, the plurality of cameras including at least one camera of a first focal length and at least one camera of a second focal length different than the first focal length, wherein the first focal length is longer than the second focal length, and at least one camera of the second focal length within each of the plurality of cells is at a position further from or equidistant from a center point of the camera array relative to cameras of the first focal length;
synthesizing a virtual image corresponding to a virtual perspective based on at least two of the plurality of images of the scene; and
displaying the virtual image.

16. The computer readable medium of claim 15, wherein the first focal length is 50 mm and the second focal length is 35 mm.

17. The computer readable medium of claim 15, wherein the program code instructions, when executed by the processor of a mediated-reality system, further cause the mediated-reality system to perform steps comprising:
projecting, via a projector, structured light onto a portion of the scene that is within a field of view of the camera array.

18. The computer readable medium of claim 15, wherein the program code instructions, when executed by the processor of a mediated-reality system, further cause the mediated-reality system to perform steps comprising:
sensing, via a depth sensor, a distance to a surface within the scene, the surface within a field of view of the camera array.

19. The computer readable medium of claim 15, wherein displaying the virtual image comprises:
presenting, via a head-mounted display (HMD), the virtual image based in part on a position and orientation of the HMD.

20. The computer readable medium of claim 15, wherein the program code instructions, when executed by the processor of a mediated-reality system, further cause the mediated-reality system to perform steps comprising:
receiving an instruction to position a swing arm coupled to the camera array; and
positioning, via the swing arm, the camera array to capture the plurality of images of the scene.

* * * * *